United States Patent

Medl et al.

[19]

[11] Patent Number: 5,986,652
[45] Date of Patent: Nov. 16, 1999

[54] METHOD FOR EDITING AN OBJECT WHEREIN STEPS FOR CREATING THE OBJECT ARE PRESERVED

[75] Inventors: Robert E. Medl, San Jose, Calif.; Joseph Phillip Bigus, Rochester, Minn.

[73] Assignee: International Business Machines Corporation, Armonk, N.Y.

[21] Appl. No.: 08/954,851

[22] Filed: Oct. 21, 1997

[51] Int. Cl.[6] .............................. G06F 3/14; G06F 17/30
[52] U.S. Cl. ..................... 345/339; 345/333; 345/356; 345/338; 345/968; 345/350; 707/501
[58] Field of Search .................................. 345/333, 334, 345/336, 338, 356, 357, 350, 968; 434/118; 707/501, 4

[56] References Cited

U.S. PATENT DOCUMENTS

| 5,019,961 | 5/1991 | Addresso et al. | 345/357 |
| 5,414,838 | 5/1995 | Kolton et al. | 707/104 |
| 5,574,843 | 11/1996 | Gerlach, Jr. | 345/348 |
| 5,668,988 | 9/1997 | Chen et al. | 707/1 |
| 5,675,752 | 10/1997 | Scott et al. | 345/333 |
| 5,754,858 | 5/1998 | Broman et al. | 395/701 |
| 5,826,086 | 10/1998 | Arima et al. | 395/701 |

OTHER PUBLICATIONS

Paradox 5 for Windows Special Edition, Que Development Group, Que Corporation, pp. 50–75, 86–93, 102–132, 235–263, 1994.

*Primary Examiner*—Raymond J. Bayerl
*Assistant Examiner*—Thomas T. Nguyen
*Attorney, Agent, or Firm*—Lacasse & Associates; Ray Strimaitis; Ingrid M. Foerster

[57] ABSTRACT

A GUI enabling instant access to a sequence of previously executed assistance programming GUIs. The assistance programming GUIs lead the user through a specific sequence of templates until an object is created. Within each template, various prompts will solicit information variables to complete the template. The assistance program will analyze the returned variables and determine a related next step template to complete the object according to a required finished product. As each step may diverge into branches based on user input, the final result becomes an interrelated sequence of steps specific to the session history of the object creation. The sequence of assistance templates are grouped into a tabular notebook. The notebook is arranged according to the original historical relationships created during the creation of the subject. Each tab is labeled to equate to the various title bars found within each individual template. To edit an information variable, the user would select a particular tab, i.e., one or more clicks from a mouse or similar known cursor pointing device. Upon editing one or more information variables, the overall result may be changed, but the original interrelationships and dependencies defined by the sequence created during the object creation is preserved.

9 Claims, 8 Drawing Sheets

METHOD FOR EDITING AN OBJECT WHEREIN STEPS FOR CREATING THE OBJECT ARE PRESERVED

BACKGROUND OF THE INVENTION

1. Field of Invention

The present invention relates generally to the field of user assistance programs. More specifically, the present invention relates to a visually seamless method of creating and editing an object using assistance programs.

2. Related Materials and Definitions

This application is related to the following co-pending application which is hereby incorporated by reference: GUI GUIDE FOR DATA MINING Ser. No. 08/955,402, filed Oct. 21, 1997.

The following definitions may be useful to the understanding of the terminology as cited throughout the following specification. Terms not specifically addresses may be located within available technical dictionaries such as the *IBM Dictionary of Computing,* New York: McGraw-Hill, 1994. This terminology may be used throughout the background, specification and claims of the present invention:

Application Program Interface (API): A functional interface supplied by the operating system or a separately licensed program that allows an application program written in a high-level language to use specific data or functions of the operating system or the licensed program.

Cluster: A group of records that have similar characteristics.

Cluster Prototype: The attribute values that are typical of all records in a given cluster. Used to compare the input records to determine if a record should be assigned to the cluster represented by these values.

Clustering: To partition a database into groups of records that have similar characteristics. A cluster profile represents the typical values of the fields for records in their assigned cluster.

Control: In SAA Advanced Common User Access architecture, a component of the user interface that allows a user to select choices or type information; for example, a check box, an entry field, a radio button.

Data Field: In a data table, the intersection from table row and table column where the corresponding data is entered.

Data Format: There are different kinds of data formats, for example, database tables, database views or flat-file tables.

Data Type: There are different kinds of data types, for example, categorical, integer or discrete.

Field: A set of one or more related data items grouped for processing. In this document, with regard to database tables and views, field is synonymous to column.

File: A collection of related data that is stored and retrieved by an assigned name. File Name: (1) A name assigned or declared for a file. (2) The name used by a program to identify a file.

File-selection Box: A box that enables the user to choose a file to work with by selecting a file name from the ones listed or by typing a file name into the space provided.

File Specification (filespec): In the AIX operating system, the name and location of a file. A file specification consists of a drive specifier, path name and file name.

File System: In the AIX operating system, the collection of files and file management structures on a physical or logical mass storage device, such as a diskette or minidisk. See also Distributed File System, Virtual File System.

Input Data: Data that is entered into a data processing system or any of its parts for storage or processing. Data received or to be received by a functional unit or by any part of a functional unit. Data to be processed. Pertaining to Intelligent Miner, the meta-data of the database table, database view or flat-file table containing the data you specified to be mined.

Instance: In object-oriented programming, a single, actual occurrence of a particular object. Any level of the object class hierarchy can have instances. An instance can be considered in terms of a copy of the object type frame that is filled with particular information.

Item Category: A categorization of an item. For example, a room in a hotel can have the following categories: Standard, Comfort, Superior, Luxury. The lowest category is called child item category. Each child item category can have several parent item categories. Each parent item category can have several grandparent item categories.

Item Description: The descriptive name of a character string in a data table.

Item Set: A collection of items. For example, all items bought by one customer during one visit to a department store.

Mining: Synonym for analyzing, searching.

Mining Base: A repository where all the information about the input data, the mining run settings, and the corresponding results is stored.

Mining Run Setting: Contains the different parameters defined for a mining run

Name Mapping: A table containing descriptive names or translations of other languages mapped to the numerals or the character strings of a data table.

Neural Network: A plurality of connections between computer processing elements, wherein the organization and weights of the connections determine the output Output Data: Data that a data processing system or any of its parts transfers outside of that system or part. Data being produced or to be produced by a device or a computer program. Data delivered or to be delivered from a functional unit or from any part of a functional unit. Pertaining to the Intelligent Miner, the meta data of the database table, database view, or flat-file table containing the data being produced or to be produced by a function.

Path: The route used to locate files; the storage location of a file. A fully qualified path lists the drive identifier, directory name, subdirectory name (if any) and file name with the associated extension.

Predicting Values: The dependency and the variation of one field's value within a record on the other fields within the same record. A profile is then generated that can predict a value for the particular field in a new record of the same form, based on its other field values.

Rule Body: Represents the premise, the specified input data for a mining function.

SAA: The Common User Access architecture, the Common Programming Interface, and the Common Communications Support.

Schema: A logical grouping for database objects. When a database object is created, it is assigned to one schema, which is determined by the name of the object For example, the following command creates table X in schema C: CREATE TABLE C.X Sequential Patterns: Intertransaction patterns such as the presence of one set of items is followed by another set of items in a database of transactions over a period of time.

Similar Time Sequences: Occurrences of similar sequences in a database of time sequences.

Structured Query Language (SQL): An established set of statements used to manage information stored in a database. By using these statements, users can add, delete or update information in a table, request information through a query, and display the results in a report.

Taxonomy: Represents a hierarchy or a lattice of associations between the item categories of an item. These associations are called taxonomy relations.

Translation Process: Converting the data provided in the database to scaled numeric values in the appropriate range for a mining kernel using neural networks. Different techniques are used depending on whether the data is numeric or symbolic. Also, converting neural network output back to the units used in the database.

Transaction: A set of items or events that are linked by a common key value, for example, the articles (items) bought by a customer (customer number) on a particular day (transaction identifier). In this example, the customer number represents the key value.

Discussion of Prior Art

Many prior art applications have small, user assistance programs, e.g. wizards, coaches, guides, which walk the user through the creation of objects in the application. Typical objects are documents, databases, spreadsheets, html pages, etc. A drawback of the prior art lies in the limited continuity between the GUI used during creation of objects and the GUI used to edit created objects. Typically, separate dissimilar GUIs are used requiring additional knowledge and therefore failing to provide an easy link between the two processes. What is needed is a GUI format that is uniformly recognizable during both the creation and development of object process steps.

Prior art wizards, coaches and guides can be found in many Microsoft® and Lotus® applications. Examples are, but not limited to, Microsoft Front Page® and Lotus Access® 97.

Whatever the precise merits, features and advantages of the above cited references, none of them achieves or fulfills the purposes of the present invention. Accordingly, it is an object of the present invention to provide for a visually seamless method of editing created objects, while preserving the steps performed during creation of the object.

It is another object of the present invention to provide an interface to the user which enables quick selection of any of a sequence of discrete object creation steps for editing thereof.

These and other objects are achieved by the detailed description that follows.

SUMMARY OF THE INVENTION

The present invention provides a GUI enabling instant access to a sequence of previously executed assistance programming GUI templates. The assistance programming GUIs lead the user through a specific sequence of templates until an object is created. Within each template, various prompts will solicit information variables to complete the template. The assistance program will analyze the returned variables and determine a related next step template to complete the object according to a required finished product. As each step may diverge into branches based on user input, the final result becomes an interrelated sequence of steps specific to the session history of the object creation. It is imperative during a subsequent editing of information variables, that the original sequence and thus interdependencies be preserved.

The present invention collects the sequence of assistance templates into a tabular notebook. The notebook is arranged according to the original historical relationships created during the creation of the subject. Each tab is labeled to equate to the various title bars found within each individual template. To edit an information variable, the user selects a particular tab, i.e. one or more clicks from a mouse or similar known cursor pointing device. Upon editing one or more information variables, the overall result may be changed, but the original interrelationships and dependancies defined by the sequence created during the object creation is preserved.

The present invention improves on the prior art and eliminates many problems associated with the prior art including, but not limited to, those previously discussed above.

DESCRIPTION OF THE PREFERRED EMBODIMENTS

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications of the materials for its construction and is not intended to limit the invention to the embodiment illustrated. Those skilled in the art will envision many other possible variations within the scope of the present invention.

Figure 1:
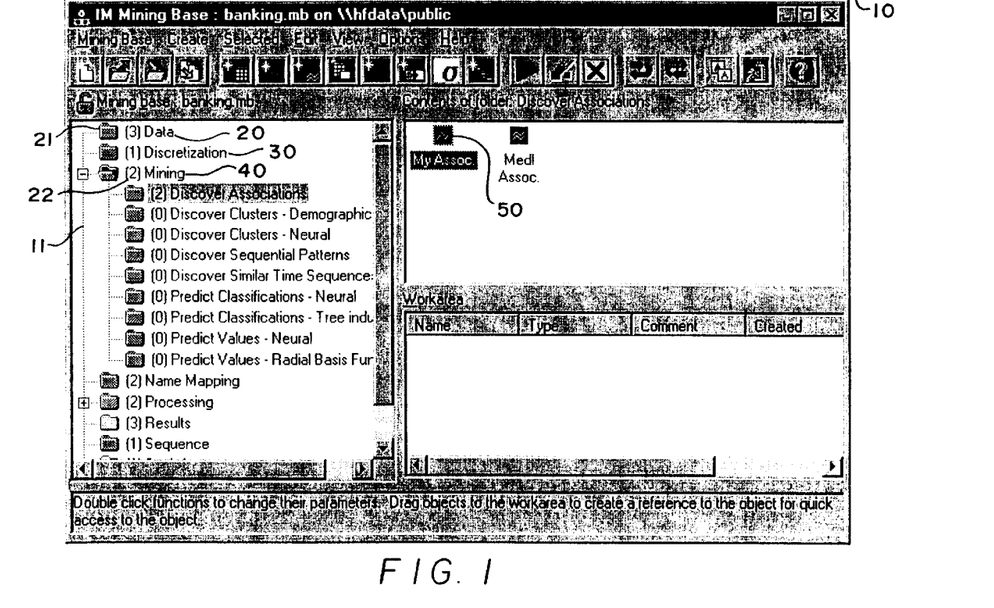
FIG. 1 illustrates a window showing a directory listing of data mining objects and sub-objects.

FIG. 1 illustrates a main panel 10 for the co-pending application entitled, GUI GUIDE FOR DATA MINING. The panel includes a tree breakout 11 of various objects 20, 30 and 40. The tree styled display of objects is very common and is not unlike that found in Windows®95 Explorer system. Each object 20,30 and 40 includes a folder 21, numeric indicator of the number of sub-objects 22 and the name given to the particular object. Objects are typically directory or file names, but are not limited thereto. In the preferred embodiment, the objects 20,30 and 40 represent data mining objects used to develop a data mining profile.

Figure 2:
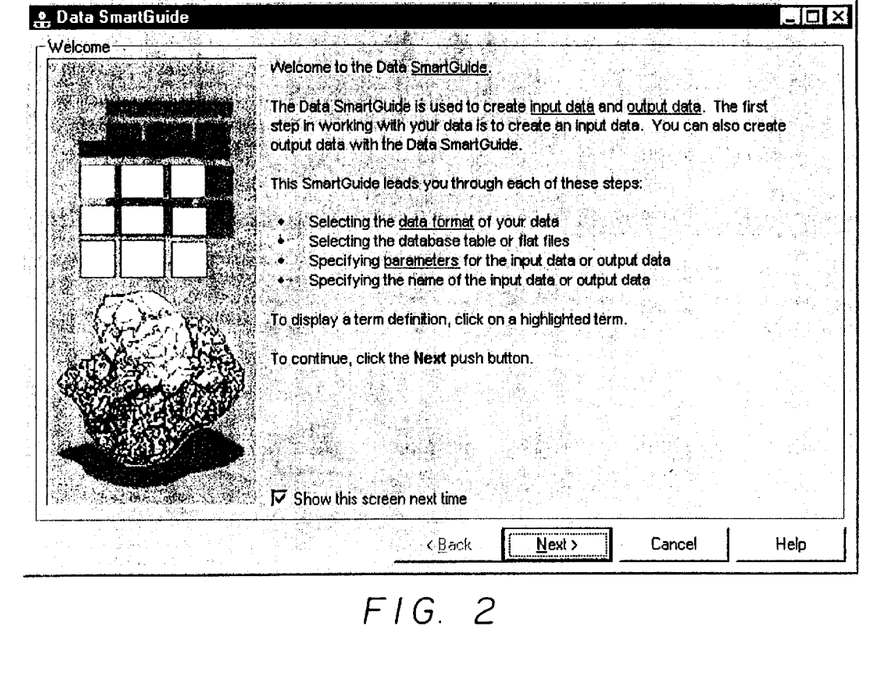
FIG. 2 illustrates a welcome page for a data mining object development system.
Figure 3:
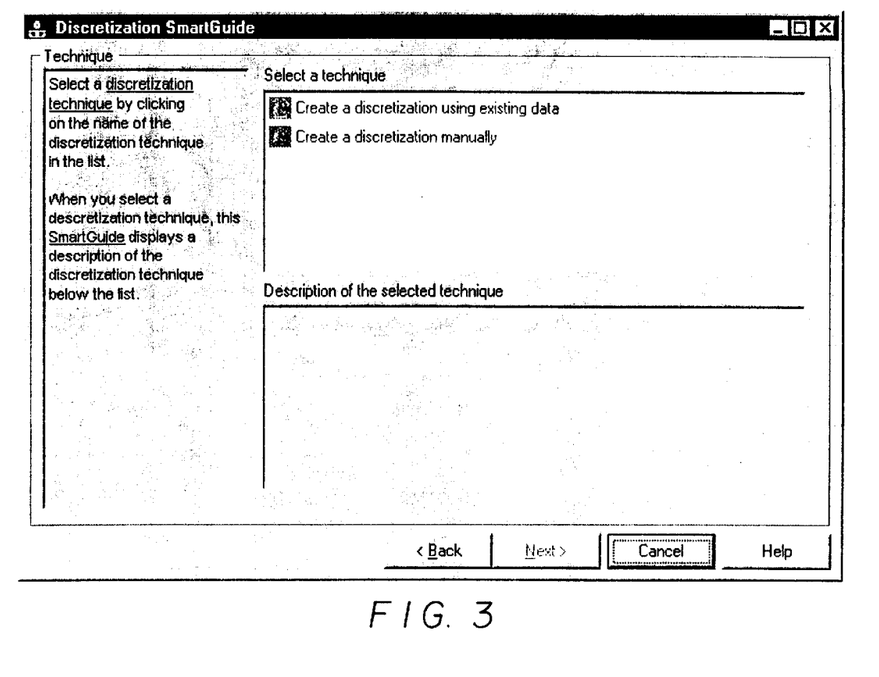
FIG. 3 illustrates a technique selection template for developing a data mining object.
Figure 4:
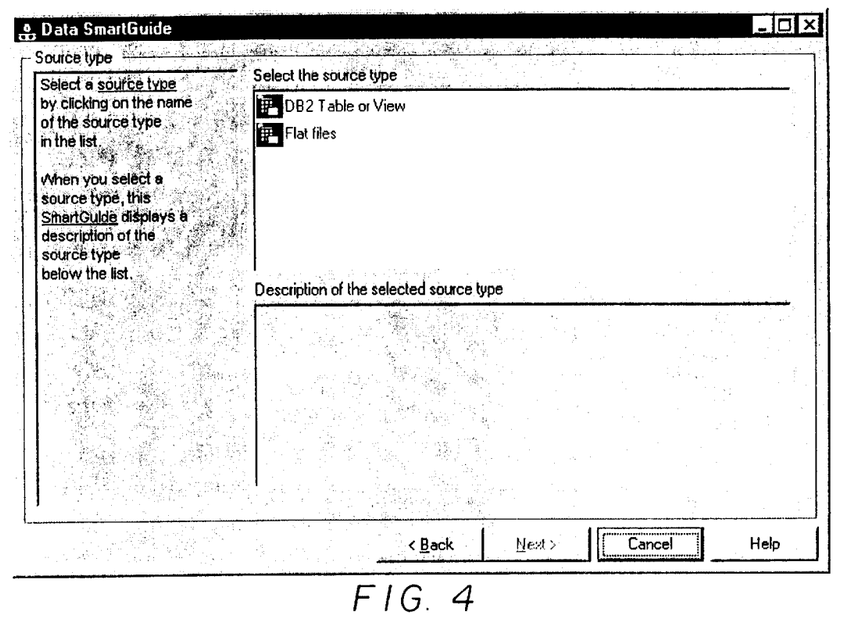
FIG. 4 illustrates a data source template for developing a data mining object
Figure 5:
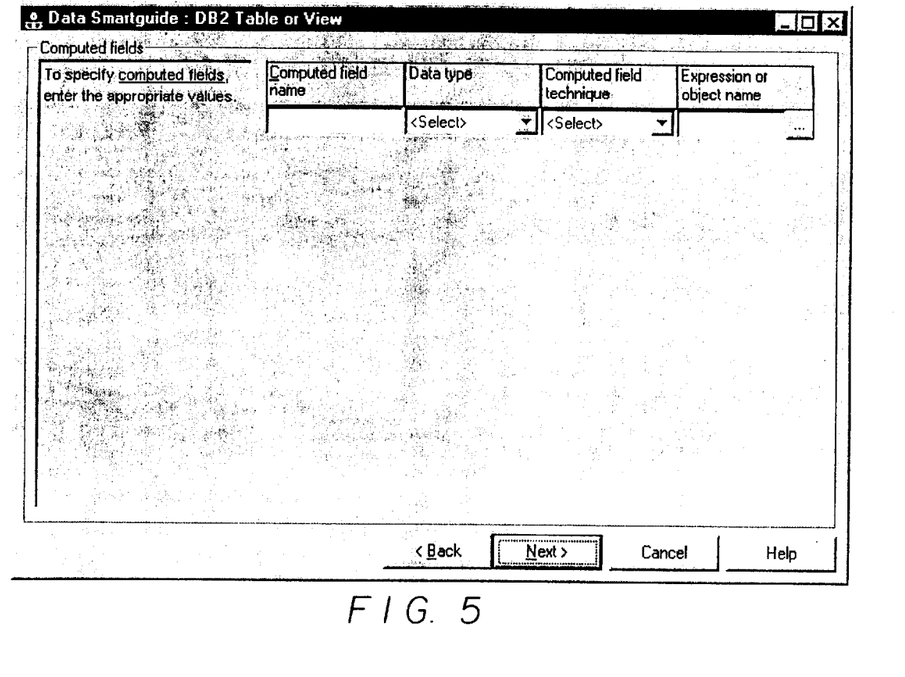
FIG. 5 illustrates an example of a parameters template for developing a data mining object.
Figure 6:
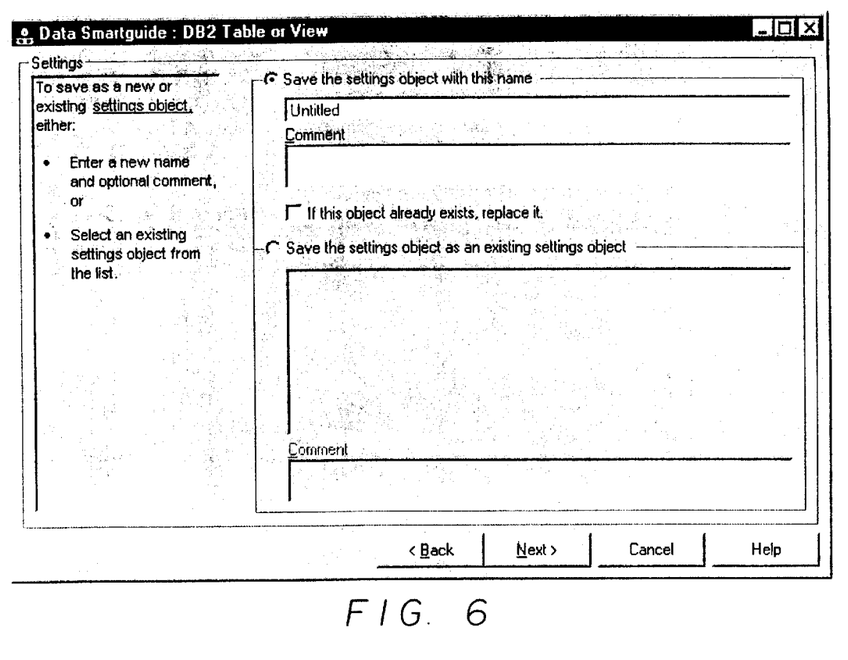
FIG. 6 illustrates a settings template for developing a data mining object
Figure 7:
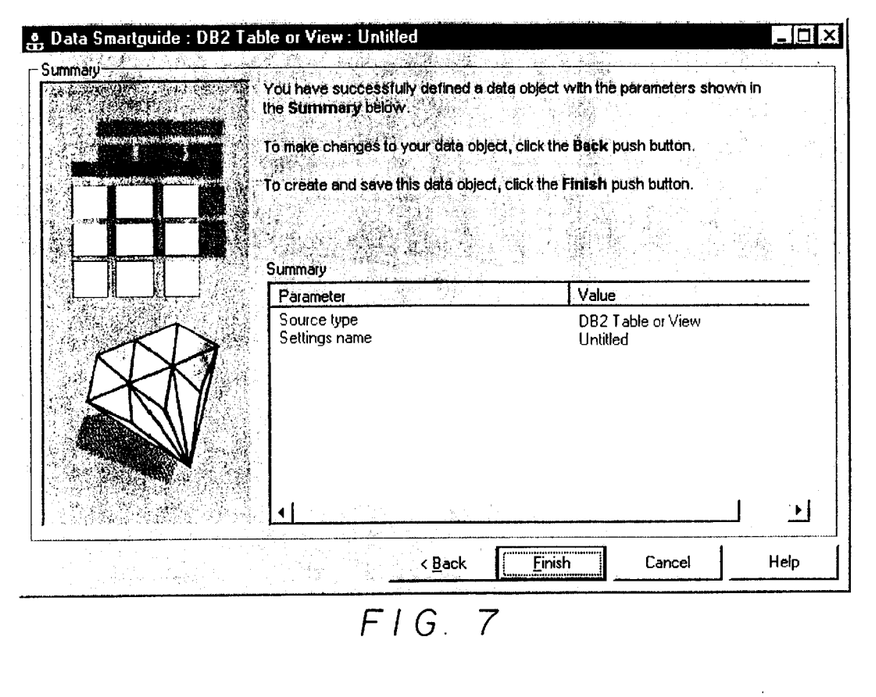
FIG. 7 illustrates a summary template for developing a data mining object.

FIGS. 2–7 represent a sequence of smartguide data mining GUI templates used to develop a data mining object 20, 30 or 40. The templates are of specific instances of a data object 20 being developed, but for the present invention can be generalized under the following heading names: Introductory/Welcome panel (FIG. 2); Technique Selection (FIG. 3); Data Source Selection (FIG. 4); Parameters Entry (FIG. 5); Settings (FIG. 6) and Summary panel (FIG. 7). What is important for the elements illustrated in FIGS. 2–7 is that each panel builds upon a previous panel creating a specific sequence of interrelated panels.

Figure 8:
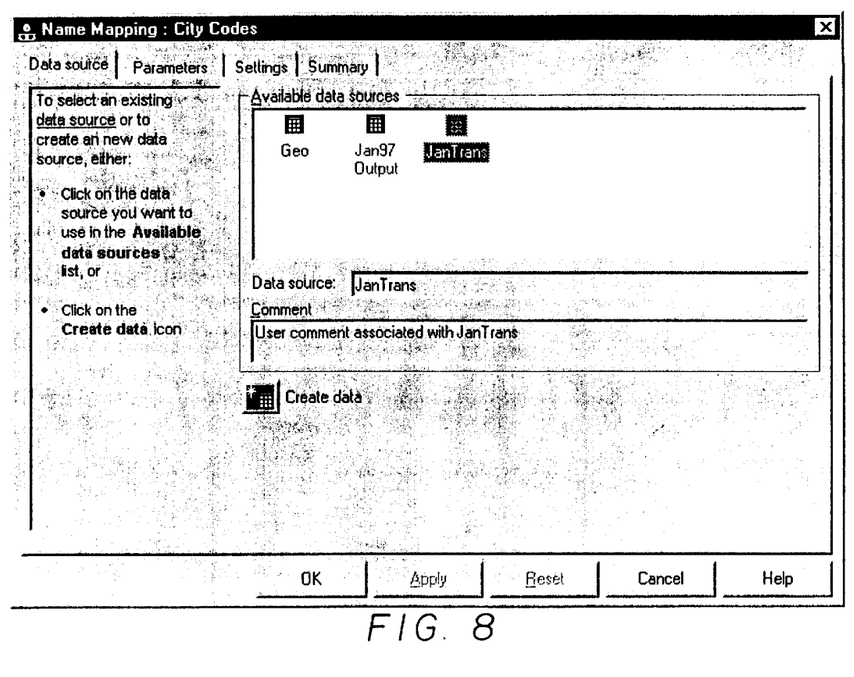
FIG. 8 illustrates the tabbed notebook editing GUI of the present invention.

FIG. 8 illustrates the present invention tabular settings notebook. Settings notebooks are provided for all objects 20, 30 and 40 that have a smartguide (non-Result objects). The sequence of panels that comprise an object's settings notebooks are identical to the panels that are provided in the object's smartguide. The page order is identical to that of the order of the panels in the Smartguide. The settings notebook's pages are contained within a tabbed notebook, with the tab labels corresponding to the smartguide panel frame labels.

Not all of the smartguide panels are shown in an object's settings notebook. Specifically, the Welcome panel (FIG. 2) is never shown. Also, in the case of the Data, Discretization, Mining, Processing and Statistics objects, the second Smartguide panel (FIG. 3), which allowed the user to specify a particular technique or function, is not shown, as the technique function selection is not a requirement of these objects. However, in all cases, when a panel appears in a settings notebook, it appears in the same relative order in which it was originally traversed.

Pages of an object's settings notebook following the object's initial page adhere to the same rules as those applied to the panels in the smartguide. For example, if the user has not chosen to create an output table, an output data page would not be present in the object's settings notebook. Or, if the user has selected a basic version of a mining function that has both a basic and an expert version, the pages that are shown in the expert version are not shown in the object's settings notebook. If, however, the user makes a change to the settings object such that a previously undisplayed page is now needed, the page is then shown in the settings notebook at the appropriate location (the appropriate location being the order in which the panel appeared in the smartguide).

The only exception to the rule that a settings notebook page is identical to its Smartguide panel counterpart is in the case of the Summary panel (FIG. 7) for Mining, Processing and Statistical objects. In these cases, the Summary panel in the settings notebook corresponds to the Summary panel of the Smartguide except that the Smartguide panel text is replaced in the settings notebook with a graphical summary view of the settings object.

To edit a developed data mining object, the user would double click on the object, e.g. 50, and the settings notebook of the present invention, FIG. 8, would appear on the screen. The user then pages through the sequence reviewing and modifying the various text, values or other decision reflective information entered during the original object creation process (FIGS. 2–7).

The above editing GUI and its individually described elements are implemented in various computing environments. For example, the present invention may be implemented on a conventional IBM PC or equivalent, multinodal system (e.g., LAN) or networking system. All programming, mining algorithms, GUIs, display panels and dialog box templates, metadata and data related thereto are stored in computer memory, static or dynamic, and may be retrieved by the user of the Intelligent Mining system in any of: conventional computer storage, display (i.e., CRT) and/or hardcopy (i.e., printed) formats. The programming of the present invention may be implemented by one of skill in the art of object-oriented programming.

Conclusion

A system and method has been shown in the above embodiments for the effective implementation of a method for editing an object wherein steps for creating objects are preserved. While various preferred embodiments have been shown and described, it will be understood that there is no intent to limit the invention by such disclosure, but rather, it is intended to cover all modifications and alternate constructions falling within the spirit and scope of the invention as defined in the appended claims. For example, the present invention should not be limited by specific sofware/program elements, computing environment, specific computing hardware or specific GUI formats.

We claim:

1. A computer-based method of presenting a sequence of user assistance programming templates for editing thereof comprising:

creating a historical sequence of interrelated user assistance templates by selection and entry of information variables, said sequence of templates specific to input values of said information variables, said templates further comprising named titles;

assembling said sequence of interrelated user assistance templates into a graphical notebook, said notebook including tabular elements retaining said named titles, and wherein input values input during said creating step may be edited by selection of a corresponding tabular element used for entry of said input variables, altering associated input variables and saving thereof, said edited sequence retaining the original sequence of said historical sequence.

2. A computer-based method of presenting a sequence of user assistance programming templates for editing thereof as per claim 1, wherein said user assistance templates comprise a GUI to develop data mining objects.

3. A computer-based method of presenting a sequence of user assistance programming templates for editing thereof as per claim 2, wherein said named titles of said sequence of templates comprise one or more of: data source, parameters, settings, summary or output.

4. A computer-based system for editing a previously traversed sequence of interrelated graphical entry templates comprising:

a first create object selection interface including one or more object types to be created;

a first introduction template related to a selected object from said one or more object types to be created, said introduction template initializing the traversal of said sequence of interrelated graphical entry templates;

a historical collection of choices and alphanumeric entries made during a subsequent traversal of said graphical entry templates;

a graphical user interface with an indexed grouping of said historical collection of choices and alphanumeric entries, and wherein said graphical user interface is indexed relative to said traversed sequence of interrelated graphical entry templates with retention of the original traversed sequence of templates during individual editing of selected entries.

5. A computer-based system for editing a previously traversed sequence of interrelated graphical entry templates as per claim 4, wherein said templates comprise a GUI to develop data mining objects.

6. A computer-based system for editing a previously traversed sequence of interrelated graphical entry templates as per claim 5, wherein said indexes comprise one or more of: data source, parameters, settings, summary or output.

7. A computer program product for use with a graphics display device, said computer program product comprising: a computer usable medium having computer readable program code means included in said medium:

said computer readable program code means embodying:

a first create object selection interface including one or more object types to be created;

a first introduction template related to a selected object from said one or more object types to be created, said introduction template initializing a sequence of interrelated graphical entry templates;

a historical collection of choices and alphanumeric entries made during a subsequent traversal of said graphical entry templates;

a graphical user interface with an indexed grouping of said historical collection of choices and alphanumeric entries, and wherein said graphical user interface is indexed relative to said sequence of interrelated graphical entry templates with retention of the original sequence of templates during individual editing of selected entries.

8. A computer program product for use with a graphics display device as per claim 7, wherein said templates comprise a GUI to develop data mining objects.

9. A computer program product for use with a graphics display device as per claim 7, wherein said indexes comprise one or more of: data source, parameters, settings, summary or output.

* * * * *

UNITED STATES PATENT AND TRADEMARK OFFICE
CERTIFICATE OF CORRECTION

PATENT NO. : 5,986,652
DATED : November 16, 1999
INVENTOR(S) : Medl et al.

It is certified that error appears in the above-identified patent and that said Letters Patent is hereby corrected as shown below:

Column 1,
Line 19, change "addresses" to -- addressed --.
Line 44, after "field," insert -- and --.

Column 2,
Line 17, after "Superior," insert -- and --.
Line 30, change "is" to -- are --.
Line 32, after "run" insert -- . --.
Line 38, after "output" insert -- . --.
Line 44, change "meta data" to -- meta-data --.
Line 65, after "object" insert -- . --.

Column 4,
Lines 30 and 34, after "object" insert -- . --.
Lines 60 and 64, change "20,30" to -- 20, 30 --.
Line 66, change "metadata" to meta-data --.

Signed and Sealed this

Twenty-fifth Day of December, 2001

*Attest:*

JAMES E. ROGAN
*Attesting Officer*       *Director of the United States Patent and Trademark Office*